US011948762B2

(12) United States Patent
Potter et al.

(10) Patent No.: US 11,948,762 B2
(45) Date of Patent: Apr. 2, 2024

(54) HIGH VOLTAGE HIGH CURRENT ARC EXTINGUISHING CONTACTOR

(71) Applicant: Astronics Advanced Electronic Systems Corp., Kirkland, WA (US)

(72) Inventors: Frederick J. Potter, Trumbauersville, PA (US); Patrick W. Mills, Bradenton, FL (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 0 days.

(21) Appl. No.: 17/725,221

(22) Filed: Apr. 20, 2022

(65) Prior Publication Data

US 2022/0351926 A1 Nov. 3, 2022

Related U.S. Application Data

(60) Provisional application No. 63/182,317, filed on Apr. 30, 2021.

(51) Int. Cl.
*H01H 3/18* (2006.01)
*H01H 33/18* (2006.01)
*H01H 33/59* (2006.01)

(52) U.S. Cl.
CPC ........ *H01H 33/182* (2013.01); *H01H 33/596* (2013.01)

(58) Field of Classification Search
CPC .... H01H 33/182; H01H 33/596; H01H 33/06; H01H 33/08; H01H 33/187; H01H 9/32; H01H 9/34; H01H 9/443; H01H 9/446; H01H 2009/305; H01H 50/38; H01H 73/303; H01H 73/18; H01H 33/6662
USPC ......... 218/38, 34, 41, 67, 68, 104, 103, 100, 218/147, 150
See application file for complete search history.

(56) References Cited

U.S. PATENT DOCUMENTS 4,659,887 A * 4/1987 Belbel ...................... H01H 9/32 218/117
4,849,591 A * 7/1989 Comtois .................. H01H 9/32 218/117
6,084,193 A * 7/2000 Pellon ...................... H01H 9/32 218/117
8,686,311 B2 * 4/2014 Vigouroux ............... H01H 9/32 218/147
8,754,728 B2 6/2014 Ito et al.
9,646,784 B2 * 5/2017 Ignatov .................. H01H 33/08
9,824,838 B2 11/2017 Faulkner
9,947,489 B2 4/2018 Kralik
10,056,208 B2 * 8/2018 To .......................... H01H 33/04
(Continued)

FOREIGN PATENT DOCUMENTS

WO 2015/177817 A1 11/2015

*Primary Examiner* — William A Bolton
(74) *Attorney, Agent, or Firm* — Wiggin and Dana LLP

(57) ABSTRACT

An electrical contactor has an arc extinguishing component. The electrical contactor includes a first electrical contact and a second electrical contact that, when the contactor is open, define a gap therebetween. The arc extinguishing component includes a magnet adjacent a first side of the gap and an electrically non-conductive shutter adjacent an opposing second side of the gap. The electrically non-conductive shutter capable of reciprocating from a first position to a second position wherein the first position is outside of the gap and the second position is within the gap.

17 Claims, 5 Drawing Sheets

(56) References Cited

U.S. PATENT DOCUMENTS

| | | | | |
|---|---|---|---|---|
| 10,134,551 | B2 | 11/2018 | Potter et al. | |
| 10,186,857 | B2 | 1/2019 | Potter et al. | |
| 10,804,056 | B2 * | 10/2020 | Strand | H01H 3/161 |
| 10,840,047 | B2 * | 11/2020 | Oh | H01H 9/32 |
| 2006/0102593 | A1 * | 5/2006 | Shea | H01H 77/104 218/7 |
| 2014/0048513 | A1 * | 2/2014 | Sato | H01H 73/18 218/117 |
| 2020/0227220 | A1 * | 7/2020 | Oehler | H01H 33/46 |
| 2020/0312584 | A1 * | 10/2020 | Zhang | H01H 1/2041 |

* cited by examiner

HIGH VOLTAGE HIGH CURRENT ARC EXTINGUISHING CONTACTOR

CROSS-REFERENCE TO RELATED PATENT APPLICATIONS

This application claims a benefit to the filing date of U.S. Provisional Patent Application Ser. No. 63/182,317, titled "High Voltage High Current Arc Extinguishing Contactor, by Fred J. Potter et al., filed Apr. 30, 2021, which is hereby incorporated by reference in its entirety herein.

BACKGROUND OF THE DISCLOSURE

When current from a high voltage direct current (>50V DC) source is interrupted by a mechanical switch, an arc forms between the switch contacts as those contacts move apart. The arc will not extinguish if the voltage needed to maintain the current flow across the gap is below the source voltage. The voltage needed to maintain the arc depends on the composition and pressure of the ionized gas filling the arc gap and also the length of the gap. If the voltage needed to maintain the arc is higher than the source voltage, the current will start to decrease as the energy contained in the magnetic field surrounding the wires is dissipated in the arc. Stored magnetic energy will keep arc current flowing until that energy is depleted, or the current is shunted into another path with a lower impedance. Extinguishing the arc quickly, before significant contact damage is done, requires one or more of the following techniques:

- lengthening the contact gap to increase the voltage needed to maintain the arc to above the voltage provided by the source;
- disrupting the ionized arc plasma so as to increase the voltage needed to maintain the arc to above the voltage provided by the source; and
- preventing the stored energy from flowing through the gap by creating another electrical path with a lower voltage characteristic than that of the contact gap, but still above the voltage needed to maintain the arc to above the voltage provided by the source.

One method to extinguish an arc is disclosed in U.S. Pat. No. 9,947,489 B2 to Kralik that is titled, "Electric Switching Apparatus Comprising an Improved Arc-Quenching Device." U.S. Pat. No. 9,947,489 is drawn to use of an arc splitter plate with a steering magnet.

Unlike U.S. Pat. No. 9,947,489, the concept below does not use an arc splitter. Rather, a ceramic shutter physically interrupts an arc plasma column. An electrically actuated barrier is combined with steering magnets to increase the arc length between the contacts and thereby raise the voltage needed to maintain the arc.

PCT International Patent Application PCT/IT2015/000110, published as WO 2015/177817 A1, and titled Circuit Breaker with Arc Extinguishing Barrier by Bticono S.p.A., recites a circuit breaker having a mobile barrier made from an electrically insulating material. The barrier is moveable from a first operating position wherein a first contact element may contact a second contact element to a second operating position when the mobile barrier is at least partially interposed between the first contact element and the second contact element and is effective to interfere with an electric arc.

Unlike PCT/IT2015/000110, the concept below combines an electrically actuated barrier with steering magnets to increase the arc length between the contacts and thereby raise the voltage needed to maintain the arc.

SUMMARY OF THE DISCLOSURE

The contactor described below is a high current resettable disconnector that will replace fuses and pyrofuses in high voltage battery applications. It is essentially a high voltage circuit breaker with a very large current break capacity and a long switching lifetime at its rated current.

IN THE DRAWINGS

FIG. 1 schematically illustrates a high voltage high current arc extinguishing contactor that includes a magnetic field to push the ionized arc gas towards a sliding panel. It includes flyback diodes that divert stored energy away from the contacts;

FIG. 2 schematically illustrates a modification to the high voltage high current arc extinguishing contactor. It includes a voltage clamping devise that diverts stored energy away from the contacts;

DETAILED DESCRIPTION

Figure 1:
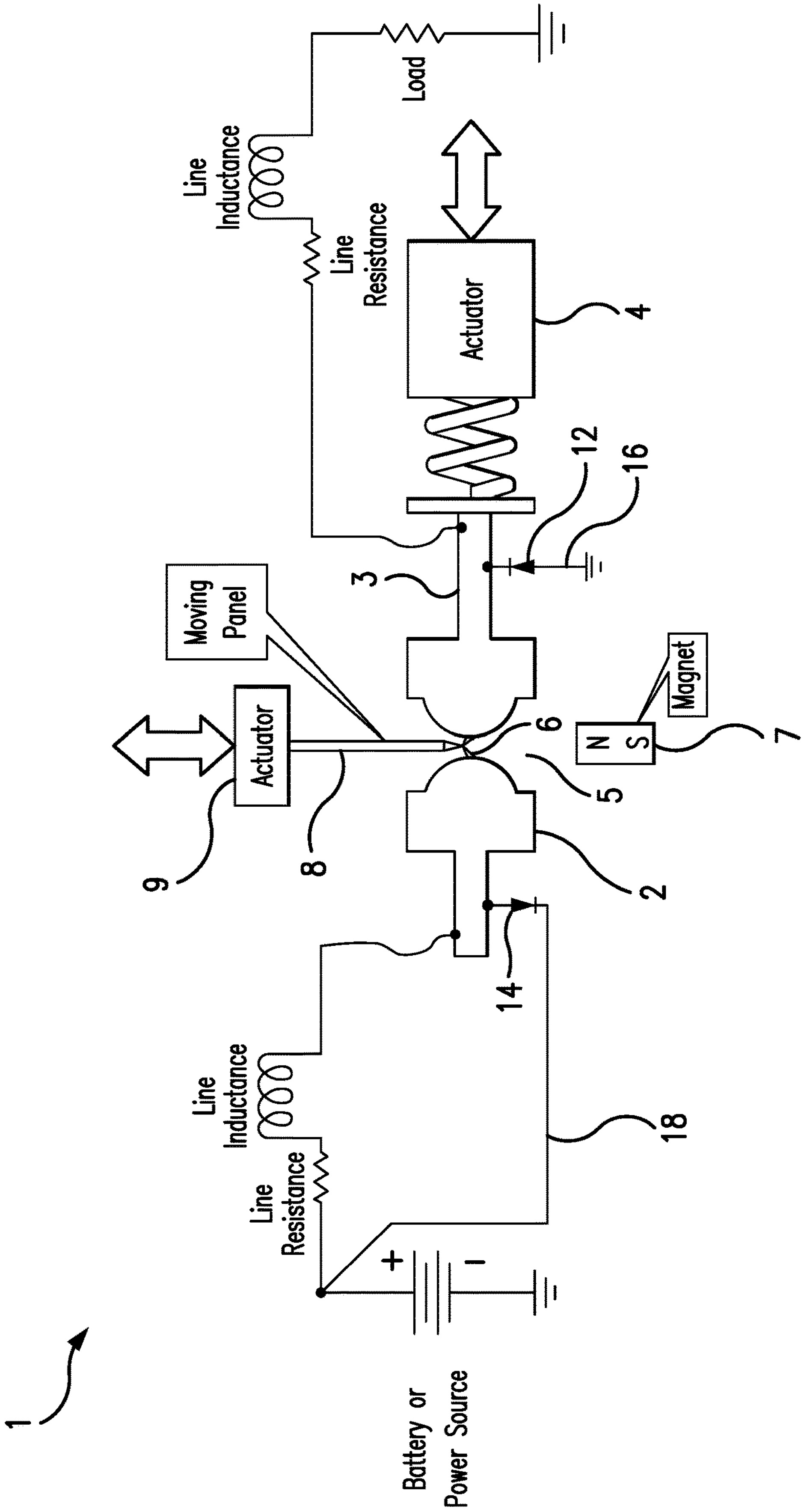

FIG. 1 schematically illustrates a high voltage high current arc extinguishing electrical contactor 1 that includes a first electrical contact 2 and a second electrical contact 3. A first actuator 9 withdraws a ceramic shutter 8 from between the contacts 2,3. A second actuator 4 then propels the second electrical contact 3 into the first electrical contact 2 when the electrical contactor 1 is closed and a flow of current is desired. The second actuator 4 pulls the second electrical contact 3 away from the first electrical contact 2 forming a gap 5 when the electrical contactor 1 is opened and termination of the flow of current is desired. Gap 5 contains ionized arc gas 6. In an embodiment, the ceramic shutter 8 is pushed into the gap 5 by a spring.

The high voltage high current arc extinguishing electrical contactor 1 includes a magnet 7 effective to generate a magnetic field that pushes the ionized arc gas 6 towards the ceramic shutter 8 (while the shutter is typically a ceramic sliding panel, other sturdy, non-conductive, non-carbonizable materials may be used instead). Upon opening, the ceramic shutter 8 is pushed into the gap 5 by a spring when the contacts 2, 3 open.

An exemplary magnet is a Grade 52 cylindrical permanent magnet composed of nickel coated neodymium-iron-boron (NdFeB)—with an axial (poles on flat ends) magnetization direction. When the cylindrical magnet has a 0.5 inch diameter and a 0.5 inch thickness, these strong magnets have a pull strength of between 18 and 20.5 pounds and a surface field of 6619 Gauss.

An exemplary ceramic for the shutter 8 is a machinable grade glass ceramic, such as Macor® machinable glass ceramic (MACOR is a registered trademark of Corning Incorporated of New York, NY). This material features a low dielectric constant and loss, a high resistivity and breakdown voltage, and an operating temperature of 176° F. (80° C.).

The magnet 7 bends the arc away from a straight path, causing the arc length to increase. The ceramic shutter 8 then cuts through the arc plasma ionized gas 6, mechanically disrupting it. The arc now must travel around the moving ceramic shutter 8, increasing the path length and increasing the voltage of the arc. Diodes 12, 14 and wiring 16, 18 help discharge the wire inductance and speed the extinguish time of the arc. Exemplary diodes are chosen based on the desired operating voltage and current ranges of the contactor.

Figure 2:
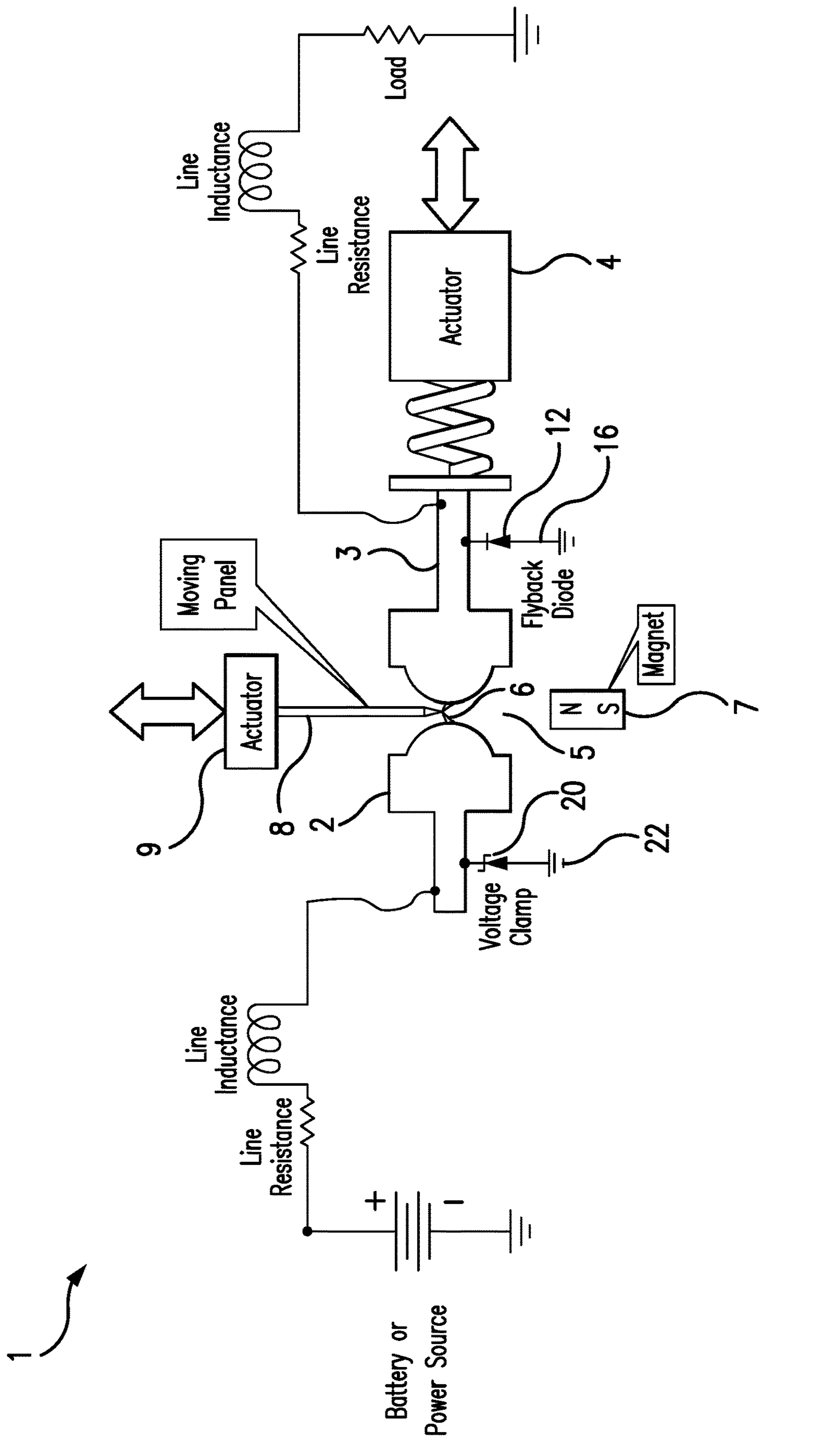

The leftmost diode 14 can be replaced with a self-resetting breakdown device, 20, as shown in FIG. 2.

A breakdown device is any device that can conduct high current after being subjected to a voltage above its breakdown voltage rating. Self-resetting means that the device returns to its non-conductive state after the voltage returns to the trigger voltage. A breakdown type diode, known as a TVS, a transient suppression module using metal oxide varistor technology, or a spark gap can fulfill this function. The spark gap, used for lightning suppression, is a better choice for interruption of high currents (10,000 Amps or more). The size and type of device selected are dependent on the contactor's ratings.

The first actuator 9 and the second actuator 4 are synchronized such that the electrically non-conductive shutter 8 reciprocates to the second position within a predetermined time after the contactor 1 transitions from closed to open. For example, when the contactor 1 is to be closed and a flow of current is desired, the first actuator 9 pulls the ceramic shutter 8 back for approximately 100 ms. 50 ms after the first actuator 9 is energized, the second actuator 4 is energized propelling the second electrical contact 3 into the first electrical contact 2 closing the electrical contactor 1. First actuator 9 is de-energized after contacts 2,3 are pulled together by actuator 4, allowing the ceramic shutter 8 to be pushed by a spring against the touching point of the closed contacts, but without sufficient force to separate them.

Figure 3:
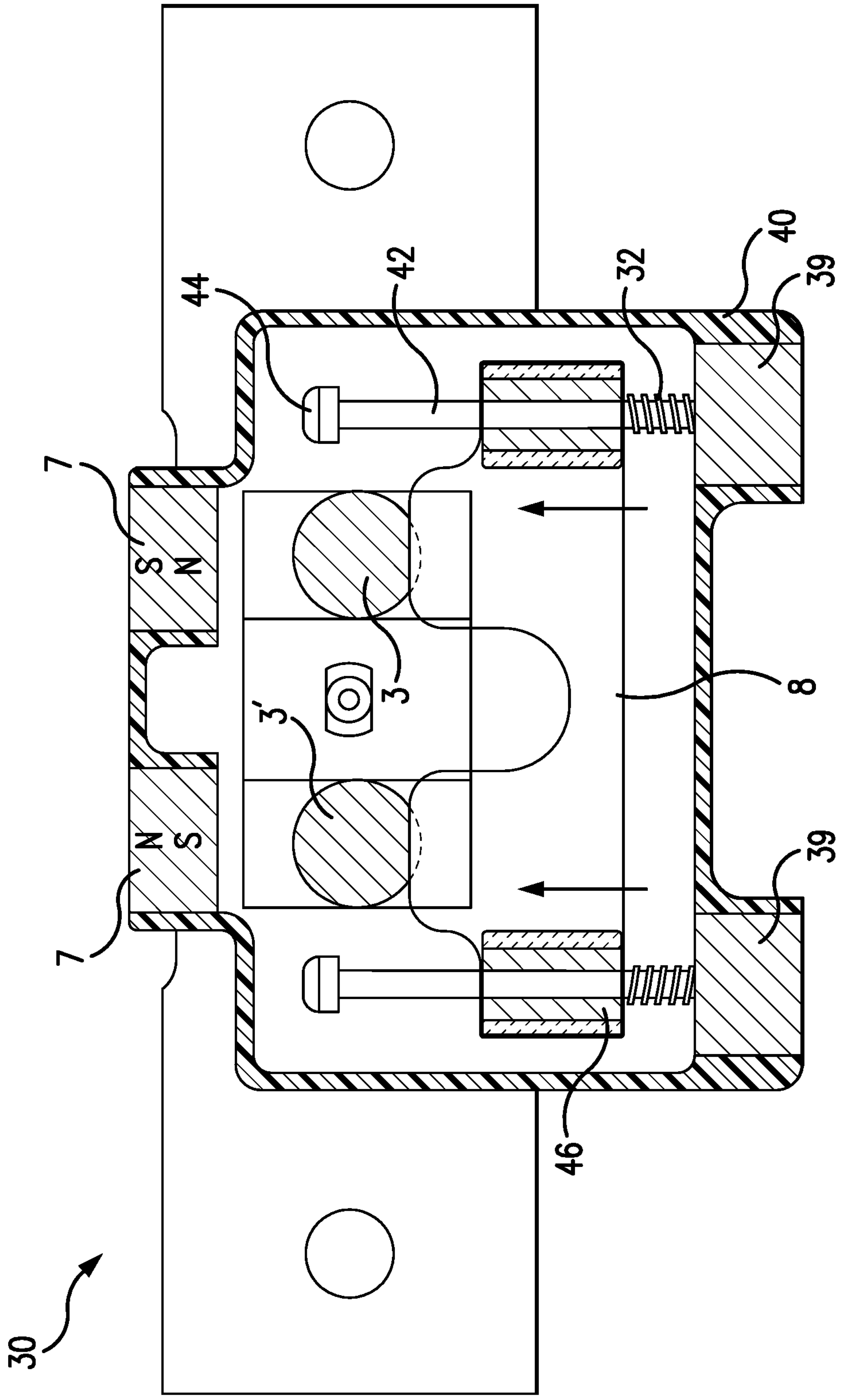
FIG. 3 illustrates the high voltage high current arc extinguishing contactor with contacts closed and panel retracted.
Figure 4:
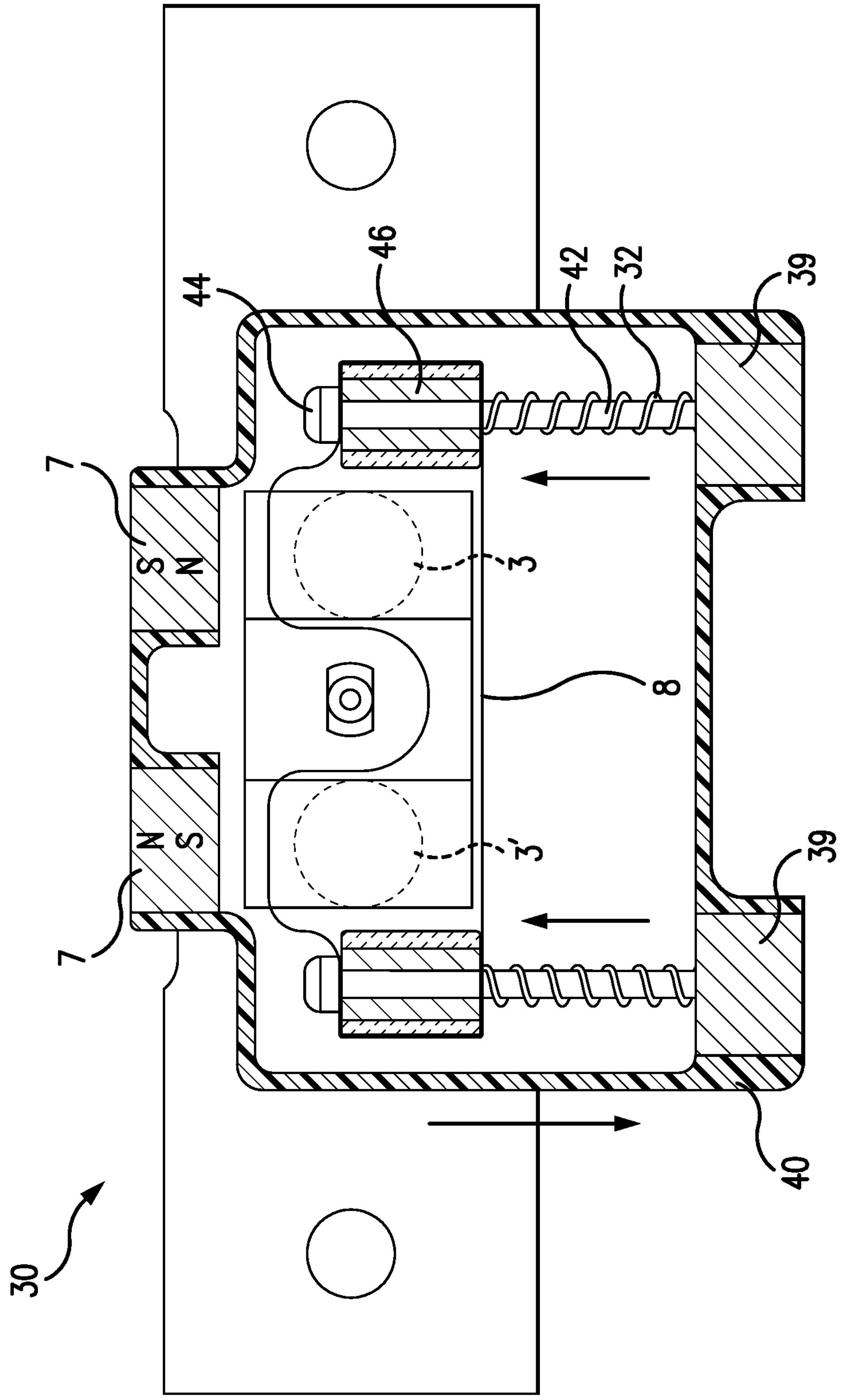
FIG. 4 illustrates the high voltage high current arc extinguishing contactor with the contacts open and the panel extended.

FIGS. 3 and 4 illustrate a sectional view of a double gap contactor 30 illustrating the reciprocating positions of the electrically non-conductive ceramic shutter 8. When the contactor is closed (FIG. 3), the electrically non-conductive ceramic shutter 8 is in a first position and a pair of electrical contacts 3, 3' aligned in series, contact a matching pair of electrical contacts (not shown) on an opposing side of the contactor. When the contactor is opened (FIG. 4), the electrically non-conductive ceramic shutter 8 is in a second position. The electrically non-conductive ceramic shutter 8 in combination with one or more high strength magnets 7 is effective to extinguish any arc caused by opening of the contactor 30. The magnets 7 may alternate in polarity to account for bi-directional current flow.

FIGS. 3 and 4 show a system for reciprocating the electrically non-conductive ceramic shutter 8. Electromagnetic coils 39 are housed within a molded plastic housing 40. Guide pins 42 project from the centers of the coils 39 terminating at a larger diameter stop 44. High strength cylindrical magnets 46 travel along the guide pins 42 with compression springs 32 disposed between the electromagnetic coils 39 and the high strength cylindrical magnets 46.

Energizing the coils 39 generates a magnetic field attracting the high strength magnets 46 pulling the electrically non-conductive ceramic shutter 8 away from the gap. Compression spring 32, or a reversal in polarity of the electromagnetic coils 39, is used to return the ceramic shutter 8 to the open contact position.

Figure 5:
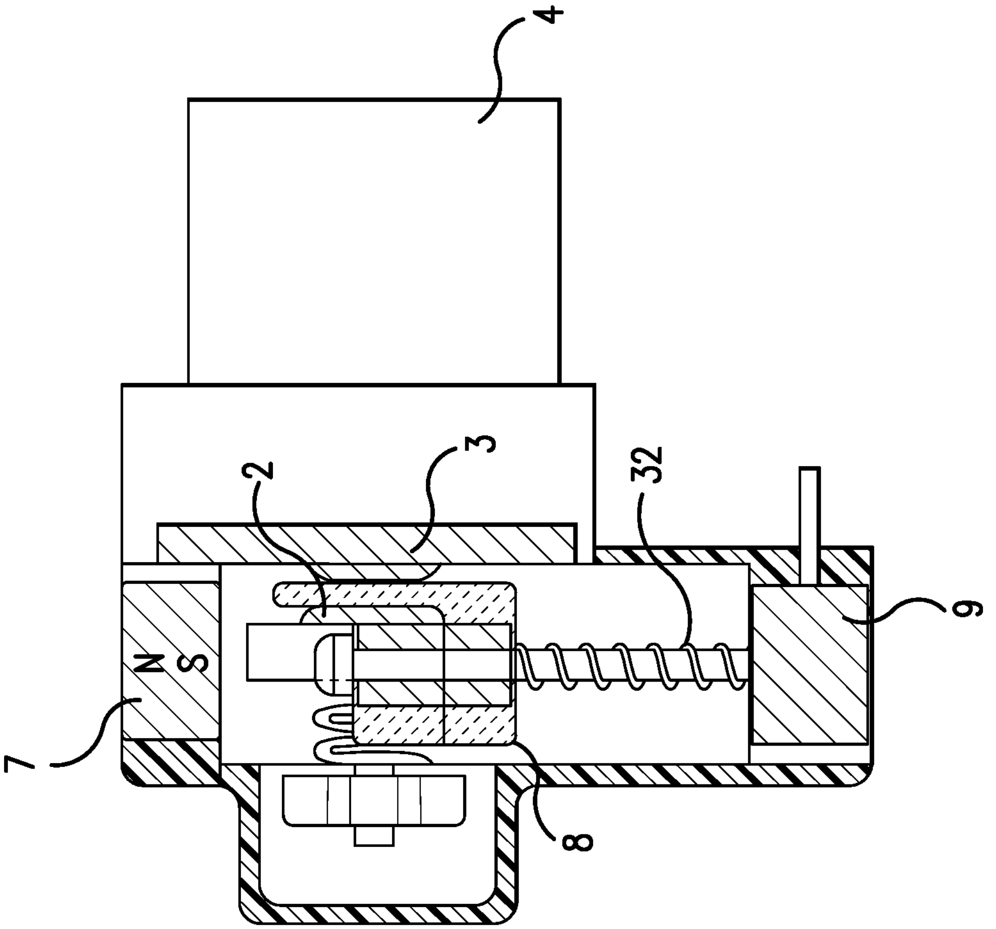
FIG. 5 illustrates a side view of the high voltage high current arc extinguishing contactor with the contacts open and panel extended as in FIG. 4.

Referencing FIG. 5, to stop the arcing when the contacts are opened, three methods are employed:

1. Strong magnets 7 are positioned near the contacts 2, 3 to force the arc plasma away from the centerline of the contacts, lengthening the arc. The magnets may alternate in polarity to account for bi-directional current flow.
2. A non-carbonizable panel 8 is pushed between the contacts 2, 3 by a spring, the panel moving towards the magnet 7 and through the arc plasma, disrupting the plasma and further lengthening the arc.
3. Diodes and/or Voltage clamping devices are employed to help to quickly dissipate the stored energy in the wiring.

The contactor described herein allows for galvanic isolation between the input and output. The air gap provided by the contacts allows for true galvanic isolation between input and output when the contactor is off. High potential can be applied between input and output, or between both terminals and ground, up to the voltage limit determined by the distance of the air gap.

Further, the contactor described herein minimizes arcing and extends contact life. The contacts do not arc extensively during switching, so that there is little to no contact degradation during the operation of the contactor.

The invention claimed is:

1. An electrical contactor having an arc extinguishing component, comprising:

a first electrical contact and a second electrical contact that, when the contactor is open, define a gap therebetween; and a first diode which electrically interconnects the first contact to a ground and a second diode which electrically interconnects the second contact to ground;

the arc extinguishing component including:

a magnet adjacent a first side of the gap; and an electrically non-conductive shutter adjacent an opposing second side of the gap, the electrically non-conductive shutter capable of reciprocating from a first position to a second position wherein the first position is outside of the gap and the second position is fully within the gap.

2. The electrical contactor of claim 1 wherein a first actuator engages one of the first or the second electrical contact and is configured to reciprocate the engaged electrical contact with respect to the other electrical contact.

3. The electrical contactor of claim 2 wherein a second actuator engages the electrically non-conductive shutter and provides a motive force to reciprocate the electrically non-conductive shutter.

4. The electrical contactor of claim 3 wherein the first actuator and the second actuator are synchronized such that the electrically non-conductive shutter reciprocates to the second position within a predetermined time after the contactor transitions from closed to open.

5. The electrical contactor of claim 4 wherein a power source is electrically interconnected to the first contact and a load is electrically interconnected to the second contact.

6. The electrical contactor of claim 5 wherein a plurality of magnets are adjacent the first side of the gap.

7. The electrical contactor of claim 6 wherein a first of the plurality of magnets has a first polarity adjacent the gap and a second of the plurality of magnets has an opposing second polarity adjacent the gap.

8. The electrical contactor of claim 6 wherein the plurality of magnets are aligned with alternating polarity adjacent the gap.

9. An electrical contactor having an arc extinguishing component, comprising:

a first electrical contact and a second electrical contact that, when the contactor is open, define a gap therebetween;

a first diode which electrically interconnects the first contact to a ground and a second diode which electrically interconnects the second contact to ground; and a breakdown device electrically interconnecting the first contact to a ground and a diode which electrically interconnects the second contact to ground;

the arc extinguishing component including:

a magnet adjacent a first side of the gap; and an electrically non-conductive shutter adjacent an opposing second side of the gap, the electrically non-conductive shutter capable of reciprocating from a first position to a second position wherein the first position is outside of the gap and the second position is fully within the gap.

10. The electrical contactor of claim 9 wherein the breakdown device is a spark gap.

11. The electrical contactor of claim 9, wherein a first actuator engages one of the first or the second electrical contact and is configured to reciprocate the engaged electrical contact with respect to the other electrical contact.

12. The electrical contactor of claim 9 wherein a second actuator engages the electrically non-conductive shutter and provides a motive force to reciprocate the electrically non-conductive shutter.

13. The electrical contactor of claim 9 wherein the first actuator and the second actuator are synchronized such that the electrically non-conductive shutter reciprocates to the second position within a predetermined time after the contactor transitions from closed to open.

14. The electrical contactor of claim 9 wherein a power source is electrically interconnected to the first contact and a load is electrically interconnected to the second contact.

15. The electrical contactor of claim 9 wherein a plurality of magnets are adjacent the first side of the gap.

16. The electrical contactor of claim 9 wherein a first of the plurality of magnets has a first polarity adjacent the gap and a second of the plurality of magnets has an opposing second polarity adjacent the gap.

17. The electrical contactor of claim 9 wherein the plurality of magnets are aligned with alternating polarity adjacent the gap.

* * * * *